(No Model.)
W. CONNELLY.
COUPLING FOR TUBULAR SECTIONS.
No. 579,817. Patented Mar. 30, 1897.
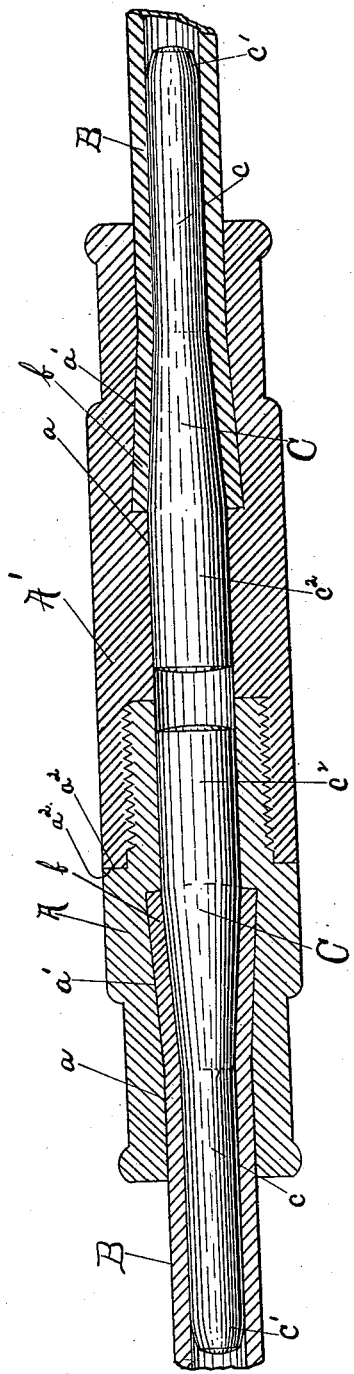
WITNESSES:
John Lord.
INVENTOR
William Connelly
BY Hallock Lord
ATTORNEY.

UNITED STATES PATENT OFFICE.

WILLIAM CONNELLY, OF TOLEDO, OHIO.

COUPLING FOR TUBULAR SECTIONS.

SPECIFICATION forming part of Letters Patent No. 579,817, dated March 30, 1897.

Application filed October 15, 1896. Serial No. 609,009. (No model.)

*To all whom it may concern:*

Be it known that I, WILLIAM CONNELLY, a citizen of the United States, residing at Toledo, in the county of Lucas and State of Ohio, have invented certain new and useful Improvements in Couplings for Tubular Sections; and I do hereby declare the following to be a full, clear, and exact description of the invention, such as will enable others skilled in the art to which it appertains to make and use the same.

This invention relates to a coupling for tubular sections; and it consists in certain improvements in the construction thereof, as will be hereinafter fully described, and pointed out in the claims.

More particularly my invention may be stated to be an improvement on the coupling claimed in a certain patent, No. 552,315, issued to me December 31, 1895.

The invention is illustrated in the accompanying drawing by one view, a longitudinal section through the center of the coupling.

The invention here shown illustrates a coupling specially adapted to use on tubular sucker-rods, but I do not wish to be limited to this use.

A marks the sleeve having the male screw of the coupling, and A' the sleeve having the female screw, which when screwed onto the male screw effects the coupling. The sleeves have the central bore $a$ and a conical enlargement $a'$, the large end of which is nearest the threaded end of the sleeve. A tubular section B is placed in the bore $a$ far enough to bring its inward end into the conical enlargement or tapered opening $a'$. A tapered plug C is then forced into the section with sufficient force to expand the end of the section into fixed contact with the wall of the tapered opening. The larger end of the tapered opening is preferably of such a diameter as to bring the inner surface of the larger end of the expanded section just flush with the bore $a$ at the threaded end of the sleeve.

It is a purpose of this invention to so secure the sections to the sleeves that they will become so fixed as to prevent their loosening by jarring or constant reciprocation. In my former structure I provided against the loosening of the plug by making the larger ends abut when the couplings were screwed together. As a result of this construction the pressure of the screw was exerted on the ends of the plugs, and as the amount of surface on the plugs in contact was so small as to act simply as a pivot, exerting practically no resistance to the unscrewing of the coupling, it has been found desirable to have the outer shoulders $a^2 a^2$ of the sleeve come into contact and receive the full force of the screw in order that the screw might be "set" against the shoulders, so that the friction on this large diameter might prevent the coupling from unscrewing. For this reason, as well as others, it has been found desirable to have each plug arranged to hold itself in place. To accomplish this purpose, I have provided the following means: I make an extension $c$ on the inner end of the tapered plug of substantially cylindrical shape, or at least having its element substantially parallel. At the end it has a slight taper $c'$, and its general diameter is a little larger than the normal diameter of the section B. It will readily be seen that this when forced to place provides a large frictional surface which securely holds the tapered part in place. The larger end of the plug also has a similar extension $c^2$, which is slightly larger than the normal bore of the sleeve, so that when this is forced home under pressure it also provides a large frictional surface, which operates to hold the plug in place against any longitudinal or rotary movement. I prefer having the extensions at both ends of the plug, but either may be used, and where one is used I prefer the one $c$ in the section. It has been found that the place where sections secured as these shown usually break is at the point where they enter the sleeve. This is accounted for by the change at this point from the rigidity incident to the sleeve and the natural elasticity of the section. To prevent the tendency to break at this point, I extend the plug, however formed, inside the section to a point outside the sleeve in order that it may form a reinforcement to the section and make the change from rigidity to elasticity more gradual, and in order that this idea may be carried further forward I taper the end of the plug so that the change from the reinforced part to the plain section may be gradual, thus obviating any tendency there may be to break at the end of reinforcement.

What I claim as new is—

1. A union for two metal sections which consists in a sleeve having a tapered opening; a tubular section in the opening; and a tapered plug having an extension with substantially parallel edges or elements, said plug and extension being forced into the sleeve and section to such a degree and the plug and extension being so shaped and of such size relatively to the sleeve and section as to expand by the taper of the plug the section into the tapered opening and to bring the extension into substantially fixed frictional contact with the walls of the sleeve or section without the tapered surface.

2. A union for two metal sections which consists in a sleeve having a tapered opening; a tubular section in the opening; and a tapered plug having an extension with substantially parallel edges or elements, said plug and extension being forced into the sleeve and section to such a degree and the plug and extension being so shaped and of such size relatively to the sleeve and section as to expand by the taper of the plug the section into the tapered opening and to bring the extension into substantially fixed frictional contact with the walls of the section without the tapered surface.

3. A union for two metal sections which consists in a sleeve having a tapered opening; a tubular section in the opening; and a tapered plug inserted in the section with sufficient force to expand the section into contact with the tapered opening, said plug extending inside the section beyond the end of the sleeve to reinforce the section at its union with the sleeve.

4. A union for two metal sections which consists in a sleeve having a tapered opening; a tubular section in the opening and a tapered plug having an extension with substantially parallel edges or elements, said plug and extension being forced into the sleeve and section to such a degree and the plug and extension being so shaped and of such size relatively to the sleeve and section as to expand by the taper of the plug the section into the tapered opening and to bring the extension into substantially fixed frictional contact with the walls of the section without the tapered surface said extension extending beyond the end of the sleeve to reinforce the section at its union with the sleeve.

5. A union for two metal sections which consists in a sleeve having a tapered opening; a tubular section in the opening; and a tapered plug inserted in the section with sufficient force to expand the section into contact with the tapered opening, said plug extending inside the section beyond the end of the sleeve to reinforce the section at its union with the sleeve and also having a gradual taper at its end within the section as set forth.

6. A union for two metal sections which consists in a sleeve having a tapered opening; a tubular section in the opening; and a tapered plug having an extension with substantially parallel edges or elements, said plug and extension being forced into the sleeve and section to such a degree and the plug and extension being so shaped and of such size relatively to the sleeve and section as to expand by the taper of the plug the section into the tapered opening and to bring the extension into substantially fixed frictional contact with the walls of the section without the tapered surface of said extension extending beyond the end of the sleeve to reinforce the section at its union with the sleeve and having a gradual taper at the end in the section as set forth.

In testimony whereof I affix my signature in presence of two witnesses.

WILLIAM CONNELLY.

Witnesses:
C. SMALLEY,
H. C. LORD.